(12) United States Patent
Natsumeda

(10) Patent No.: US 9,146,350 B2
(45) Date of Patent: Sep. 29, 2015

(54) OPTICAL ELEMENT, LIGHT SOURCE DEVICE, AND PROJECTION DISPLAY DEVICE

(75) Inventor: Masanao Natsumeda, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 522 days.

(21) Appl. No.: 13/395,921

(22) PCT Filed: Sep. 30, 2010

(86) PCT No.: PCT/JP2010/067084
§ 371 (c)(1),
(2), (4) Date: Mar. 14, 2012

(87) PCT Pub. No.: WO2011/040528
PCT Pub. Date: Apr. 7, 2011

(65) Prior Publication Data
US 2012/0176766 A1 Jul. 12, 2012

(30) Foreign Application Priority Data

Sep. 30, 2009 (JP) .................................. 2009-227331

(51) Int. Cl.
*F21V 9/14* (2006.01)
*F21V 9/00* (2015.01)
*G02B 6/122* (2006.01)
*F21V 8/00* (2006.01)
*B82Y 20/00* (2011.01)

(52) U.S. Cl.
CPC ............... *G02B 6/1226* (2013.01); *B82Y 20/00* (2013.01); *G02B 6/005* (2013.01); *G02B 6/0053* (2013.01); *G02B 6/0068* (2013.01)

(58) Field of Classification Search
USPC .................................... 362/193; 62/84; 385/5
See application file for complete search history.

(56) References Cited

U.S. PATENT DOCUMENTS

| 2003/0184989 A1 | 10/2003 | Matsumoto et al. |
| 2007/0181889 A1* | 8/2007 | Orita ............................... 257/79 |
| 2009/0086477 A1* | 4/2009 | Noba et al. .................... 362/231 |

FOREIGN PATENT DOCUMENTS

| CN | 1216114 A | 5/1999 |
| JP | 2001-067685 A | 3/2001 |
| JP | 2002-063722 A | 2/2002 |

(Continued)

OTHER PUBLICATIONS

Hoepfner, Christian, "61.1:Invited Paper: PhlatLight Photonic Lattice LEDs for RPTV Light Engines", SID 06 Digest, 2006, pp. 1808-1811.

(Continued)

*Primary Examiner* — Thomas A Hollweg
*Assistant Examiner* — Jacob R Stern
(74) *Attorney, Agent, or Firm* — Sughrue Mion, PLLC

(57) ABSTRACT

Disclosed is an optical element that includes: a light guide body into which light from a light-emitting element enters; carrier generation layer (6) formed in the light guide body, in which carriers are generated by the light from the light guide body; plasmon excitation layer (8) stacked on carrier generation layer (6), which has a plasma frequency higher than the frequency of light generated when carrier generation layer (6) is excited by the light from the light-emitting element; and wave vector conversion layer (10) stacked on plasmon excitation layer (8), which converts light incident from plasmon excitation layer (8) into light having a predetermined exit angle to output the light. Plasmon excitation layer (8) is sandwiched between low dielectric constant layer (7) and high dielectric constant layer (9).

21 Claims, 14 Drawing Sheets

(56) References Cited

FOREIGN PATENT DOCUMENTS

| JP | 2003-295183 A | 10/2003 |
|---|---|---|
| JP | 2008-145510 A | 6/2008 |
| JP | 2009-087695 A | 4/2009 |

OTHER PUBLICATIONS

Office Action dated Dec. 3, 2013 issued by the State Intellectual Property Office of the People's Republic of China in counterpart Chinese Patent Application No. 201080043918.4.

Xie, Bingchuan, "Dielectric Characteristic and Optical Absorption of Composite Media: Graded Spherical Particle", Chinese Journal of Computational Physics, vol. 24, No. 4, Jul. 31, 2007, pp. 475-479.

Liu, Dan et al, "The Light Source, Optical Waveguide and Light Enhancement of Nano-integrated Optical Circuit", ACTA Physic Sinica, vol. 57, No. 1, Jan. 31, 2008, pp. 371-381.

Tan, Lin et al, "Progress in Synthesis of Low Dielectric Constant Polyimide", Petrochemical Technology, vol. 37, No. 7, Dec. 31, 2008, pp. 744-749.

* cited by examiner

OPTICAL ELEMENT, LIGHT SOURCE DEVICE, AND PROJECTION DISPLAY DEVICE

CROSS REFERENCE TO RELATED APPLICATIONS

This application is a National Stage of International Application No. PCT/JP2010/067084 filed Sep. 30, 2010, claiming priority based on Japanese Patent Application No. 2009-227331 filed Sep. 30, 2009 the contents of all of which are incorporated herein by reference in their entirety.

TECHNICAL FIELD

The present invention relates to an optical element that uses plasmon coupling to output light, a light source device, and a projection display device.

BACKGROUND ART

There has been proposed a light-emitting diode (LED) projector that uses a LED as a light-emitting element included in the light source device. The LED projector of this type includes a light source device having a LED, an illumination optical system into which light from the light source device enters, a light bulb having a liquid crystal display plate into which light from the illumination optical system enters, and a projection optical system for projecting light from the light bulb to a projection surface.

In the LED projector, to increase the luminance of a projected image, light loss must be prevented as much as possible on an optical path from the light source device to the light bulb.

As described in Nonpatent Literature 1, there are restrictions based on Etendue that are determined by the product of the area of the light source device and the radiation angle. In other words, the light from the light source device is not used as projection light unless the value of the product of the light-emitting area of the light source device and the radiation angle is set equal to or less than the value of the product of an incident surface area of the light bulb and a capture angle (solid angle) determined by the F number of a projection lens.

Thus, in the light source device that includes the LED and an optical element into which light from the LED enters, reducing the light loss by lowering the etendue of light output from the optical element is an issue that requires attention.

In the light source device included in the LED projector, it is essential to achieve a projected luminous flux of about several thousand lumina by using a plurality of LEDs to compensate for a shortage of the amount of light emitted by a single LED.

As an example of such a light source using a plurality of LEDs, as shown in FIG. 1, Patent Literature 1 discloses a light source unit that includes a plurality of monochromatic light source devices 83a to 83f having LEDs 84a to 84f, optical axis matching members 82a to 82d for matching optical axes of lights output from monochromatic light sources 83a to 83f, light source sets 81a and 81b into which lights from optical axis matching members 82a to 82d enter, and light guiding device 80 into which the lights from light source sets 81a and 81b enter. In this light source unit, lights from the plurality of monochromatic light source devices 83a to 83f are synthesized, and lights that have radiation angles narrowed by light source sets 81a and 81b enter light guiding device 80. In this configuration, light loss is reduced by narrowing the radiation angles of the light incident on light guiding device 80.

As another example of the light source device using the plurality of LEDs, as shown in FIG. 2, Patent Literature 2 discloses a light source device that includes light source substrate 86 having a plurality of LEDs 85 arranged on a plane. This light source device includes an optical element having two prism sheets 88 and 89 each having prism columns formed on one surface and arranged by setting the prism columns to intersect reach other, and frame 87 for supporting prism sheets 88 and 89. In the light source device, lights from the plurality of LEDs 85 are synthesized by two prism sheets 88 and 89.

CITATION LIST

Patent Literature

Patent Literature 1: JP2008-145510A
Patent Literature 2: JP2009-87695A

Nonpatent Literature

Nonpatent Literature 1: PhlatLight™ Photonic Grating LEDs for RPTV Light Engines Christian Hoepfner, SID Symposium Digest 37, 1808 (2006)

SUMMARY OF INVENTION

However, in the configuration described in Patent Literature 1, light-emitting areas on dichroic reflection surfaces of optical axis matching members 82a to 82d are larger than those of LEDs 84a to 84f. As a result, when the etendue of the light incident on light guiding device 80 is compared with that of the lights from LEDs 84a to 84f, there is no change in the etendue.

Thus, in the configuration described in Patent Literature 1, the etendue of the light output from light guiding device 80, which is dependent on the etendue of LEDs 84a to 84f, cannot be reduced.

In the configuration described in Patent Literature 2, the arrangement of the plurality of LEDs 85 on the plane causes in overall size of the light-emitting area of the light source, hence a problem arises in which there is an increase in the etendue of the light source itself.

In other words, in the configurations disclosed in Patent Literatures 1 and 2, the etendues of the lights from the light source unit and the light source device are dependent on that of the light from the LED, and hence the etendue of the light from the optical element cannot be reduced.

It is an object of the present invention to provide an optical element that can solve the abovementioned problems of the related technologies and reduce the etendue of light output from the optical element without any dependence on the etendue of a light-emitting element, a light source device that includes the same, and to provide a projection display device.

Solution to Problems

To achieve the object, an optical element according to the present invention includes: a light guide body into which light from a light-emitting element enters; a carrier generation layer formed in the light guide body, in which carriers are generated by the light from the light guide body; a plasmon excitation layer stacked on the carrier generation layer, which has a plasma frequency higher than a frequency of light generated when the carrier generation layer is excited by the light from the light-emitting element; and an exit layer stacked on the plasmon excitation layer, which converts light incident from the plasmon excitation layer into light having a predetermined exit angle to output the light. The plasmon excitation layer is sandwiched between two layers having dielectric properties.

A light source device according to the present invention includes an optical element of the present invention, and a light-emitting element located on an outer circumference of the light guide body.

A projection display device according to the present invention includes the light source device of the present invention, and a projection optical system that projects a projected image by light output from the light source device.

Effects of Invention

According to the present invention, the etendue of the light from the optical element can be reduced without any dependence on the etendue of the light-emitting element.

DESCRIPTION OF EMBODIMENTS

Next, specific embodiments of the present invention are described with reference to the accompanying drawings.

First Embodiment

Figure 1:
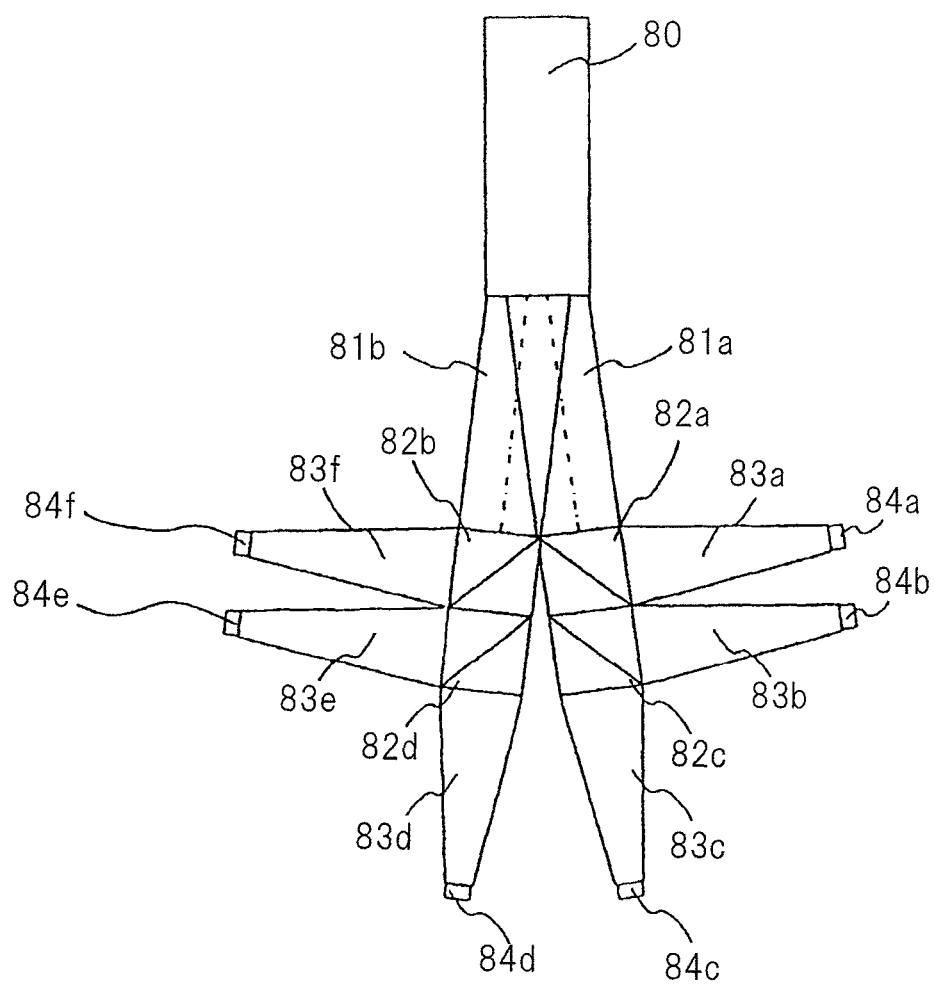
FIG. 1 is an explanatory schematic view showing a configuration according to Patent Literature 1.
Figure 2:
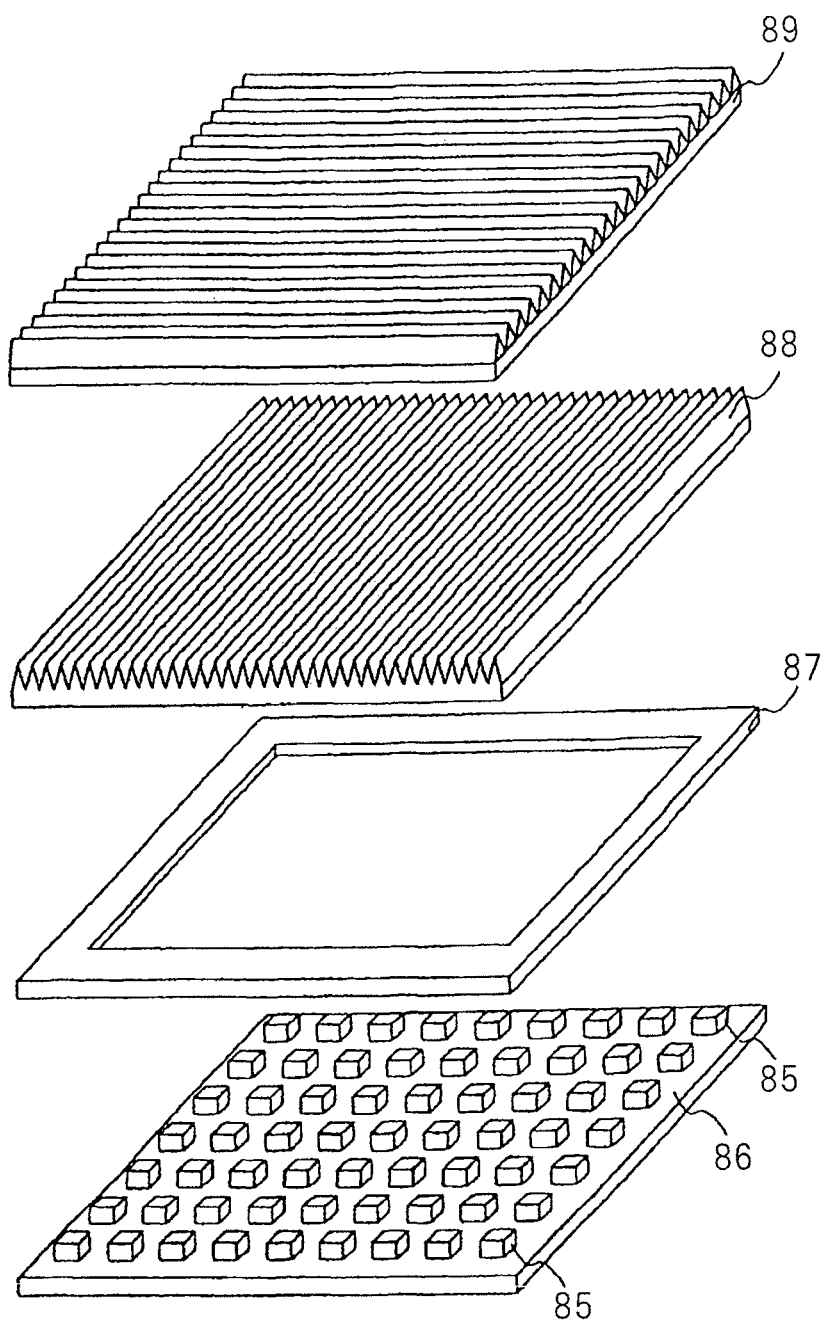
FIG. 2 is an explanatory exploded perspective view showing a configuration according to Patent Literature 2.
Figure 3:
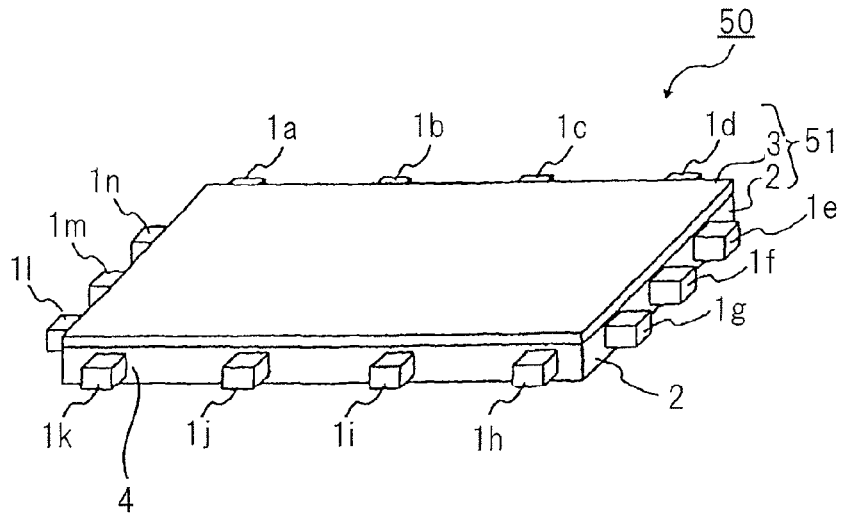
FIG. 3 is a perspective view schematically showing a light source device according to a first embodiment.
Figure 4:
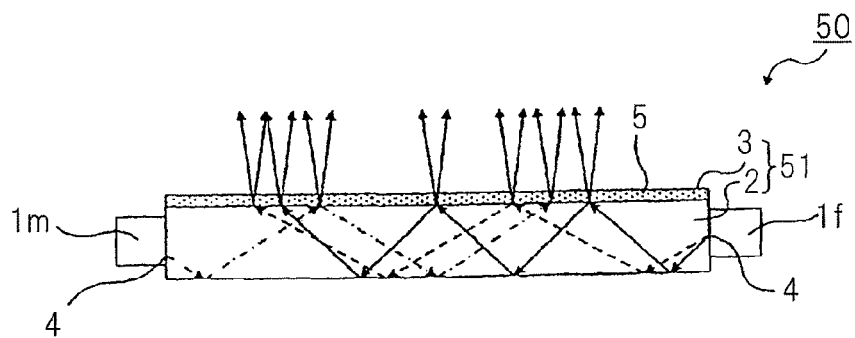
FIG. 4 is an explanatory sectional view showing behavior of light in the light source device according to the first embodiment.

FIG. 3 is a schematic perspective view showing a configuration of a light source device according to a first embodiment. FIG. 4 is an explanatory sectional view showing behavior of light in the light source device according to the present invention. In the light source device, individual layers actually have a very large thickness, and there is a large difference in thickness among the layers. It is therefore difficult to draw the layers in accurate scale and proportion. Thus, in the drawings, the layers are not drawn in actual proportion, and hence are schematically shown.

As shown in FIGS. 3 and 4, light source device 50 according to the present embodiment includes a plurality of light-emitting elements 1 (1a to 1n) and optical element 51 into which lights output from light-emitting elements 1 enter. Optical element 51 includes light guide body 2 into which the lights output from light-emitting elements 1 enter, and directional control layer 3 for emitting output light by entering the light from light guide body 2.

Directional control layer 3 is for improving directionality of output light from light source device 50. For example, as in the case of the first embodiment shown in FIG. 5, directional control layer 3 includes carrier generation layer 6 formed in light guide body 2, in which carriers are generated by a part of light incident from light guide body 2, plasomon excitation layer 8 stacked on carrier generation layer 6, which has a plasma frequency higher than a frequency of light generated when carrier generation layer 6 is excited by the light from the light-emitting element 1, and wave vector conversion layer 10 stacked on plasmon excitation layer 8, which is an exit layer for converting a wave vector of incident light to output the light.

Figure 5:
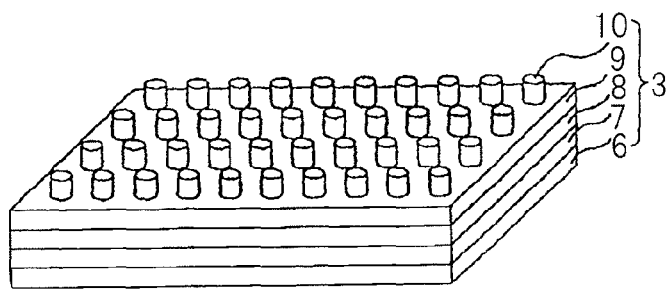
FIG. 5 is a perspective view schematically showing a directional control layer included in the light source device according to the first embodiment.

Plasmon excitation layer 8 is sandwiched between two layers having dielectric properties. As the two layers having dielectric properties, as shown in FIG. 5, directional control layer 3 includes high dielectric constant layer 9 sandwiched between plasmon excitation layer 8 and wave vector conversion layer 10, and low dielectric constant layer 7 having a lower dielectric constant than high dielectric constant layer 9, which is sandwiched between carrier generation layer 6 and plasmon excitation layer 8.

Optical element 1 according to the present embodiment is configured such that an effective dielectric constant of an incident side portion including the entire structure stacked on light guide body 2 side of plasmon excitation layer 8 (hereinafter, simply referred to as incident side portion) is lower than that of the exit side portion including the entire structure stacked on wave vector conversion layer 10 side of plasmon excitation layer 8 and a medium brought into contact with wave vector conversion layer 10 (hereinafter, simply referred to as exit side portion). The entire structure stacked on light guide body 2 side of plasmon excitation layer 8 includes light guide body 2. The entire structure stacked on wave vector conversion layer 10 of plasmon excitation layer 8 includes wave vector conversion layer 10.

In other words, according to the first embodiment, the effective dielectric constant of the incident side portion including light guide body 2 and carrier generation layer 6 with respect to plasmon excitation layer 8 is lower than that of the exit side portion including wave vector conversion layer 10 and the medium with respect to plasmon excitation layer 8.

Specifically, the real part of the complex effective dielectric constant of the incident side portion (light-emitting element 1 side) of plasmon excitation layer 8 is set lower than that of the complex effective dielectric constant of the exit side portion (wave vector conversion layer 10 side) of plasmon excitation layer 8.

The complex effective dielectric constant $\varepsilon_{\mathit{eff}}$ is represented by the following expression (1), in which an x axis and a y axis are directions parallel to the interface of plasmon excitation layer 8, a z axis is a direction vertical to the interface of plasmon excitation layer 8, $\omega$ is an angular frequency of light output from carrier generation layer 6, $\varepsilon(\omega, x, y, $ and $z)$ is a dielectric constant distribution of dielectrics in the incident side portion and the exit side portion with respect to plasmon excitation layer 8, $k_{spp,z}$ is a z component of a wave number of a surface plasmon, and j is an imaginary unit:

[Formula 1]

$$\varepsilon_{\mathit{eff}} = \frac{\iiint_{D} \varepsilon(\omega, x, y, z) \exp(2jk_{spp,z}z)}{\iiint_{D} \exp(z)} \quad \text{Formula (1)}$$

An integration range D is a range of three-dimensional coordinates of the incident side portion or the exit side portion with respect to plasmon excitation layer 8. In other words, the range of x-axis and y-axis directions in the integration range D is a range up to the outer circumferential surface of the structure included in the incident side portion or the outer circumferential surface of the structure included in the exit surface portion not including the medium, and a range up to the outer edge in a plane parallel to the interface of plasmon excitation layer 8. The range of the z-axis direction in the integration range D is the range of the incident side portion or the exit side portion (including medium).

The z component $k_{spp,z}$ of the wave number of the surface plasmon and x and y components $k_{spp}$ of the wave number of the surface plasmon are represented by the following expressions (2) and (3), in which $\varepsilon_{metal}$ is a real part of a dielectric constant of plasmon excitation layer 8, and $k_0$ is a wave number of light in vacuum:

[Formula 2]

$$k_{spp,z} = \sqrt{\varepsilon_{eff} k_0^2 - k_{spp}^2}  \qquad \text{Formula (2)}$$

[Formula 3]

$$k_{spp} = k_0 \sqrt{\frac{\varepsilon_{eff} \varepsilon_{metal}}{\varepsilon_{eff} + \varepsilon_{metal}}}  \qquad \text{Formula (3)}$$

Thus, by using the expressions (1) to (3) and substituting ∈(ω, x, y, and z) with a dielectric constant distribution ∈$_{in}$(ω, x, y, and z) of the incident side portion of plasmon excitation layer 8 and a dielectric constant distribution ∈$_{out}$(ω, x, y, and z) of the exit side portion of plasmon excitation layer 8, a complex effective dielectric constant ∈$_{effin}$ of the incident side portion and a complex effective dielectric constant ∈$_{effout}$ of the exit side portion with respect to plasmon excitation layer 8 are calculated. In reality, a complex effective dielectric constant ∈$_{eff}$ is easily acquired by providing an appropriate initial value as a complex effective dielectric constant ∈$_{eff}$ and repeatedly calculating the expressions (1) to (3). When the dielectric constant of a layer in contact with plasmon excitation layer 8 is very high, the z component $k_{spp,z}$ of the wave number of the surface plasmon in the interface becomes a real number. This is equivalent to not generating any surface plasmon in the interface. The dielectric constant of the layer in contact with plasmon excitation layer 8 accordingly corresponds to an effective dielectric constant in this case.

An effective interaction distance $d_{eff}$ of the surface plasmon when intensity of the surface plasmon is $e^{-2}$ is calculated by the following expression (4):

[Formula 4]

$$d_{eff} = \text{Im}\left[\frac{1}{k_{spp,z}}\right]  \qquad \text{Formula (4)}$$

Low dielectric constant layer 7 has a lower dielectric constant than that of high dielectric constant layer 9. The relationship of $1 \leq \varepsilon_{lr}(\lambda_0) < \varepsilon_{hr}(\lambda_0)$ is satisfied, in which $\varepsilon_l(\lambda_0)$ is a complex dielectric constant of low dielectric constant layer 7, $\varepsilon_{lr}(\lambda_0)$ is its real part, $\varepsilon_{li}(\lambda_0)$ is its imaginary part, $\varepsilon_h(\lambda_0)$ is a complex dielectric constant of high dielectric constant layer 9, $\varepsilon_{hr}(\lambda_0)$ is its real part, $\varepsilon_{hi}(\lambda_0)$ is its imaginary part, and $\lambda_0$ is a wavelength of light incident on the dielectric constant layer in vacuum.

However, even when the dielectric constant of low dielectric constant layer 7 is higher than that of high dielectric constant layer 9, optical element 51 operates as long as the real part of the effective dielectric constant of low dielectric constant layer 7 side of plasmon excitation layer 8 is lower than that of the effective dielectric constant of high dielectric constant layer 9 side of plasmon excitation layer 8. In other words, for dielectric constants of low dielectric constant layer 7 and high dielectric constant layer 9, a range where the real part of the effective dielectric constant of the exit side of plasmon excitation layer 8 is maintained higher than that of the effective dielectric constant of the incident side is permitted.

As an example indicating the idea of an effective dielectric constant, a case where low dielectric constant layer 7 includes a dielectric constant layer A and a dielectric constant layer B is discussed, in which high dielectric constant layer 9 includes dielectric constant layer C and dielectric constant layer D, and in which dielectric constant layer B and dielectric constant layer C adjacent to plasmon excitation layer 8 are sufficiently small in film thickness (e.g., 10 nanometers or less). In this case, dielectric constant layer A functions as a low dielectric constant layer, and dielectric constant layer D functions as a high dielectric constant layer. This is because the film thickness of dielectric constant layer B and dielectric constant layer C is very small and has almost no influence on the effective dielectric constant. In other words, complex dielectric constants of low dielectric constant layer 7 and high dielectric constant layer 9 can be set taking into consideration the complex effective dielectric constant.

An imaginary part $\varepsilon_{li}(\lambda_0)$ and an imaginary part $\varepsilon_{hi}(\lambda_0)$ at an emission frequency are preferably set as small as possible. This facilitates plasmon coupling, enabling reduction of light loss.

Preferably, the imaginary part of a complex dielectric constant is also set as small as possible at the medium adjacent to any layers including light guide body 2, excluding carrier generation layer 6 and plasmon excitation layer 8, or wave vector conversion layer 10. Setting the imaginary part of the complex dielectric constant as small as possible facilitates plasmon coupling, enabling reduction of light loss.

The medium around light source device 50, namely, the medium in contact with light guide body 2 or wave vector conversion layer 10, can be one of a solid substance, liquid, and gas. Media can be different between light guide body 2 side and wave vector conversion layer 10 side.

According to the present embodiment, the plurality of light-emitting elements 1a to 1n are arranged at predetermined intervals on four side faces of flat-plate light guide body 2. Places where light-emitting elements 1a to 1n are in contact with the side faces are light incident parts 4. For light-emitting element 1, for example, the light-emitting diode (LED) for emitting light of a wavelength that carrier generation layer 6 can absorb, a laser diode, or a super luminescent diode is used. Light-emitting element 1 can be located away from light incident part 4 of light guide body 2. For example, it can be optically connected to light guide body 2 by a light guiding member such as a light bulb.

In the embodiment, light guide body 2 is formed into the flat-pate shape. However, the shape of light guide body 2 is not limited to a rectangular parallelepiped shape. A structure such as a microprism for controlling light distribution characteristics can be formed in light guide body 2. In light guide body 2, a reflection film can be formed on the full surface or a part of the outer circumference excluding light exit part 5 and light incident part 4. Similarly, in light source device 50, a reflection film (not shown) can be formed on the full surface or a part of the outer circumference excluding light exit part 5 and light incident part 4. For the reflection film, for example, a metallic material such as silver or aluminum or a dielectric multilayer film is used.

For carrier generation layer 6, for example, an organic phosphor such as rhodamine (Rhodamine 6G) or sulforhodamine (sulphorhofdamine 101), a fluorescent substance such as a CdSe or CdSe/ZnS quantum-dot phosphor, an inorganic material (semiconductor) such as GaN or GaAs, (thiophene/phenylene) co-oligomer, or an organic material (semiconductor material) such as Alq3 is used. When the fluorescent substance is used, in carrier generation layer 6, materials for generating fluorescence of a plurality of wavelengths that are equal or different in emission wavelength can be mixed. The thickness of carrier generation layer 6 is desirably 1 micrometers or less.

For low dielectric constant layer 7, for example, a SiO$_2$ nanorod array film or a thin film or a porous film such as SiO$_2$, $AlF_3$, $MgF_2$, $NaAlF_6$, NaF, LiF, $CaF_2$, $BaF_2$, or low dielectric constant plastic is preferably used. The thickness of low dielectric constant layer 7 is desirably as small as possible.

For high dielectric constant layer 9, for example, a high dielectric constant material such as diamond, $TiO_2$, $CeO_2$, $Ta_2O_5$, $ZrO_2$, $Sb_2O_3$, $HfO_2$, $La_2O_3$, $NdO_3$, $Y_2O_3$, ZnO, or $Nb_2O_5$ is preferably used.

Plasmon excitation layer 8 is a particulate layer or a thin-film layer made of a material having a plasma frequency higher than the frequency (emission frequency) of light generated when single carrier generation layer 6 is excited by light of light-emitting element 1. In other words, plasmon excitation layer 8 has a negative dielectric constant at an emission frequency generated when single carrier generation layer 6 is excited by the light of light-emitting element 1.

Materials used for plasmon excitation layer 8 are, for example, gold, silver, copper, platinum, palladium, rhodium, osmium, ruthenium, iridium, iron, tin, zinc, cobalt, nickel, chromium, titanium, tantalum, tungsten, indium, and aluminum, or an alloy of these. Among the materials of plasmon excitation layer 8, gold, silver, copper, platinum, and aluminum, and an alloy mainly containing these are preferable, and gold, silver, and aluminum, and an alloy mainly containing these are particularly preferable.

Plasmon excitation layer 8 is preferably formed with a thickness equal to or less than 200 nanometers, more preferably about 10 nanometers to 100 nanometers. The distance from the interface between high dielectric constant layer 9 and plasmon excitation layer 8 to the interface between low dielectric constant layer 7 and carrier generation layer 6 is preferably set equal to or less than 500 nanometers. This distance corresponds to the distance where plasmon coupling occurs between carrier generation layer 6 and plasmon excitation layer 8.

Wave vector conversion layer 10 is an exit layer for taking, by converting a wave vector of light incident on wave vector conversion layer 10, light out of high dielectric constant layer 9 and outputting the light from optical element 51. In other words, wave vector conversion unit 10 outputs the light received from high dielectric constant layer 9 from optical element 51 by converting its exit angle into a predetermined angle. That is, wave vector conversion layer 10 functions to output the light from optical element 51 to be almost orthogonal to the interface with high dielectric constant layer 9.

For wave vector conversion layer 10, for example, a surface-relief grating, a periodic structure represented by a photonic crystal, a quasi-periodic structure (texture structure larger than the wavelength of light from high dielectric constant layer 9) or a quasi-crystal structure, a surface structure having a rough surface, a hologram, or a microlens array is used. The quasi-periodic structure is, for example, an incomplete periodic structure in which a part of a periodic structure is omitted. Among them, the periodic structure represented by the photonic crystal, the quasi-periodic structure, the quasi-crystal structure, and the microlens array are preferably used. This is because not only light taking-out efficiency can be increased but also because directionality can be controlled. When the photonic crystal is used, a crystal structure desirably employs a triangular grating structure. Wave vector conversion layer 10 can employ a structure that includes a convex part formed on a flat-plate base. Wave vector conversion layer 10 can be made of a material different from that of high dielectric constant layer 9.

Regarding light source device 50 thus configured, an operation of outputting light from light exit part 5 of directional control layer 3 by entering the light into directional control layer 3 from light-emitting layer 1, will be described.

As shown in FIG. 4, light output from, for example, light-emitting element 1f among the plurality of light-emitting elements 1, is transmitted through light incident part 4 of light guide body 2, and propagated in light guide body 2 while being in a condition of total reflection. In this case, a part of the light incident on the interface between light guide body 2 and directional control layer 3 is output from light exit part 5 with a wavelength in a direction corresponding to characteristics, described below, of plasmon excitation layer 8 of directional control layer 3. Light not output from light exit part 5 is returned to light guide body 2, and a part of the light incident on the interface between light guide body 2 and directional control layer 3 is transmitted again through directional control layer 3 and output from light exit part 5. Through repetition of these operations, most of the light incident on light guide body 2 is output from light exit part 5. Light output from, among the plurality of light-emitting elements 1, light-emitting element 1m located opposite to light-emitting element 1f that sandwiches light guide body 2 and that is transmitted through light incident part 4 is similarly output from light exit part 5. The direction and wavelength of the light output from light exit part 5 depend only on the characteristics of directional control layer 3, whereas the direction and output of this light is not dependent on the location of light-emitting part 1 and an incident angle on the interface between light guide body 2 and directional control layer 3. Hereinafter, unless specified otherwise, a case where the wave vector conversion layer has a photonic crystal structure will be described.

FIG. 5 is an explanatory enlarged view showing a configuration and a function of directional control layer 3. In the light that is propagated in light guide body 2 in a condition of total reflection, the condition of total reflection is broken on the interface between light guide body 2 and carrier generation layer 6, and the light from light-emitting layer 1 enters into carrier generation layer 6. The light incident on carrier generation layer 6 generates carriers in carrier generation layer 6. The generated carrier causes plasmon coupling with free electrons in plasmon excitation layer 8. Through the plasmon coupling, light is radiated into high dielectric constant layer 9, and diffracted by wave vector conversion layer 10 to exit from light source device 50. The light output from one point of high dielectric constant layer 9 has an annular intensity distribution where the light concentrically spreads as it is propagated. When an exit angle having highest intensity is set as the center exit angle, and an angle width from the center exit angle to the exit angle halved in intensity is set as the exit angle width, the center exit angle and the exit angle width of the light output from high dielectric constant layer 9 are determined by effective dielectric constants of the exit side portion and the incident side portion of plasmon excitation layer 8, the complex dielectric constant of plasmon excitation layer 8, and the emission spectral width of carrier generation layer 6.

Figure 6A:
FIG. 6A is an explanatory sectional view showing a manufacturing process in the light source device according to the first embodiment.
Figure 6B:
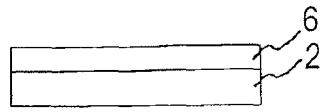
FIG. 6B is an explanatory sectional view showing the manufacturing process in the light source device according to the first embodiment.
Figure 6C:
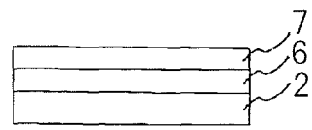
FIG. 6C is an explanatory sectional view showing the manufacturing process in the light source device according to the first embodiment.
Figure 6D:
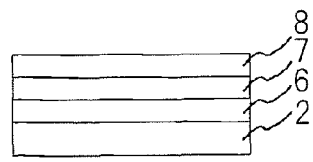
FIG. 6D is an explanatory sectional view showing the manufacturing process in the light source device according to the first embodiment.
Figure 6E:
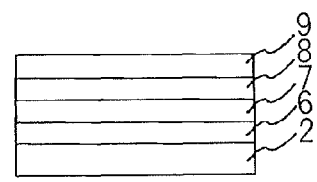
FIG. 6E is an explanatory sectional view showing the manufacturing process in the light source device according to the first embodiment.

FIGS. 6A to 6E show a manufacturing process of optical element 51 included in light source device 50. This process is only an example, and thus the present invention is not limited to this manufacturing method. First, as shown in FIGS. 6A and 6B, carrier generation layer 6 is deposited on light guide body 2 by spin-coating. Then, as shown in FIGS. 6C to 6E, low dielectric constant layer 7, plasmon excitation layer 8, and high dielectric constant layer 9 are stacked in order on carrier generation layer 6 by, for example, physical vapor deposition, electron beam deposition, or sputtering.

Figure 7A:
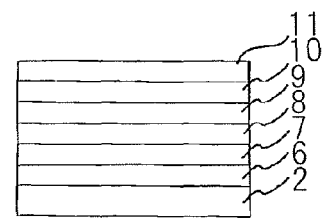
FIG. 7A is an explanatory sectional view showing a forming process of a photonic crystal in the light source device according to the first embodiment.
Figure 7B:
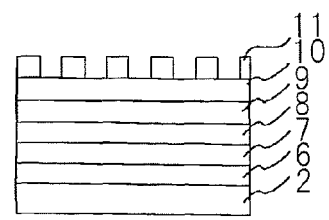
FIG. 7B is an explanatory sectional view showing the forming process of the photonic crystal in the light source device according to the first embodiment.
Figure 7C:
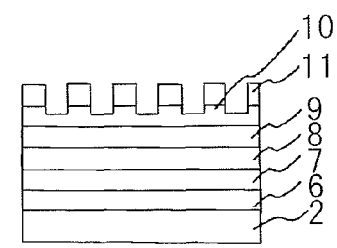
FIG. 7C is an explanatory sectional view showing the forming process of the photonic crystal in the light source device according to the first embodiment.
Figure 7D:
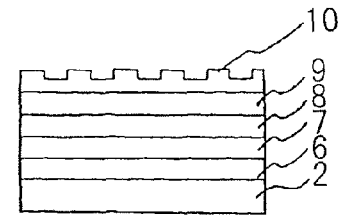
FIG. 7D is an explanatory sectional view showing the forming process of the photonic crystal in the light source device according to the first embodiment.

FIGS. 7A to 7D show a process of forming wave vector conversion layer 10 by a photonic crystal. As shown in FIG. 7A, wave vector conversion layer 10 is formed on high dielectric constant layer 9, and resist film 11 is deposited on wave vector conversion layer 10 by spin coating. As shown in FIG. 7B, the negative pattern of the photonic crystal is transferred to resist film 11 by nano-imprinting. As shown in FIG. 7C, wave vector conversion layer 10 is etched to a desired depth by dry etching. Then, as shown in FIG. 7D, resist film 11 is peeled. Lastly, a plurality of light-emitting elements 1 are arranged on the outer circumferential surface of light guide body 2 to complete light source device 50.

FIGS. 8A to 8H show another process of forming wave vector conversion layer 10 on the surface of high dielectric constant layer 9 of light source device 50 by a photonic crystal. This process is only an example, and thus the present invention is not limited to this manufacturing method.

Figure 8A:
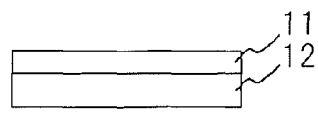
FIG. 8A is an explanatory sectional view showing another example of a forming process of a photonic crystal in the light source device according to the first embodiment.
Figure 8B:
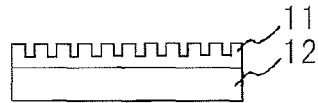
FIG. 8B is an explanatory sectional view showing another example of the forming process of the photonic crystal in the light source device according to the first embodiment.
Figure 8C:
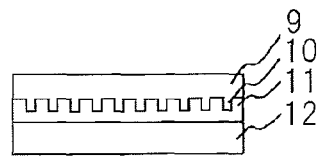
FIG. 8C is an explanatory sectional view showing another example of the forming process of the photonic crystal in the light source device according to the first embodiment.
Figure 8D:
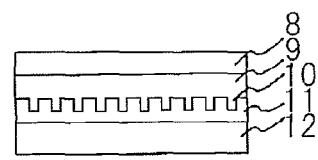
FIG. 8D is an explanatory sectional view showing another example of the forming process of the photonic crystal in the light source device according to the first embodiment.
Figure 8E:
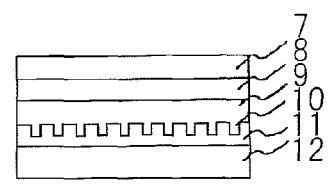
FIG. 8E is an explanatory sectional view showing another example of the forming process of the photonic crystal in the light source device according to the first embodiment.
Figure 8F:
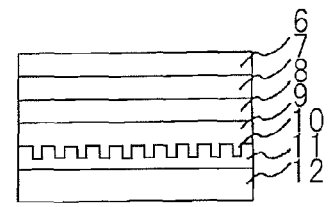
FIG. 8F is an explanatory sectional view showing another example of the forming process of the photonic crystal in the light source device according to the first embodiment.
Figure 8G:
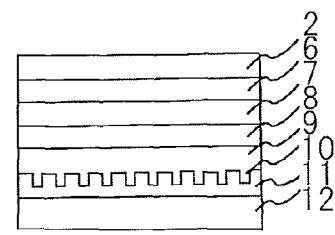
FIG. 8G is an explanatory sectional view showing another example of the forming process of the photonic crystal in the light source device according to the first embodiment.
Figure 8H:
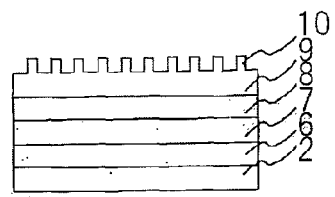
FIG. 8H is an explanatory sectional view showing another example of the forming process of the photonic crystal in the light source device according to the first embodiment.

As shown in FIG. 8A, resist film 11 is deposited on substrate 12 by spin coating. As shown in FIG. 8B, the negative pattern of the photonic crystal is transferred to resist film 11 by nano-imprinting. Then, as shown in FIGS. 8C to 8E, high dielectric constant layer 9, plasmon excitation layer 8, and low dielectric constant layer 7 are stacked in order by physical vapor deposition, electron beam deposition, or sputtering. As shown in FIG. 8F, carrier generation layer 6 is deposited on low dielectric constant layer 7 by spin coating. As shown in FIG. 8G, light guide body 2 is pressure-bonded to carrier generation layer 6 to be dried. Lastly, as shown in FIG. 8H, after peeling of resist film 11 from substrate 12, a plurality of light-emitting elements 1 are arranged on the outer circumferential surface of light guide body 2 to complete light source device 50.

On the surface of high dielectric constant layer 9 opposite light guide body 2, instead of using the photonic crystal for wave vector conversion layer 10, a microlens array can be disposed or a rough surface can be formed.

Figure 9:
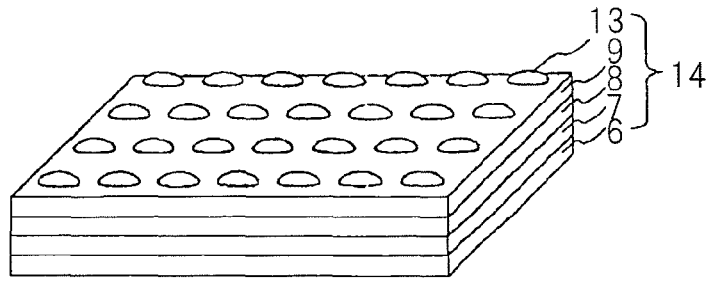
FIG. 9 is a perspective view showing a configuration where a microlens array is disposed on a surface of the directional control layer according to the first embodiment.

FIG. 9 shows a configuration example of a directional control layer where a microlens array is disposed on the surface of high dielectric constant layer 9. As shown in FIG. 9, even when directional control layer 14 includes microlens array 13, the same effects as those when the photonic crystal is used for wave vector conversion layer 10 are acquired.

Figure 10A:
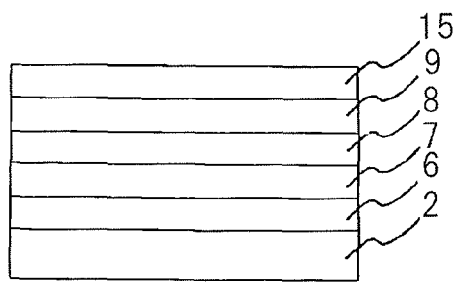
FIG. 10A is an explanatory sectional view showing a forming process of the microlens array in the light source device according to the first embodiment.
Figure 10B:
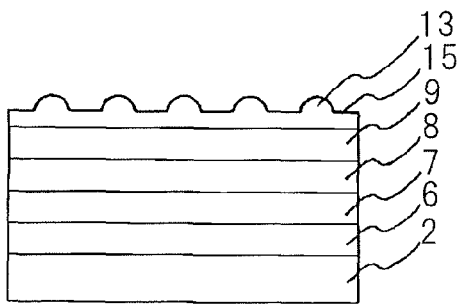
FIG. 10B is an explanatory sectional view showing the forming process of the microlens array in the light source device according to the first embodiment.

FIGS. 10A and 10B are explanatory sectional views showing the manufacturing process of a configuration where microlens array 13 is stacked on high dielectric constant layer 9. In the configuration including microlens array 13, as in the case of the manufacturing method shown in FIGS. 6A to 6E, layers including carrier generation layer 6 to high dielectric constant layer 9 are stacked on light guide body 2, and thus description of these steps is omitted.

As shown in FIGS. 10A and 10B, after the layers, from carrier generation layer 6 to high dielectric constant layer 9, have been stacked on light guide body 2 by using the manufacturing method shown in FIGS. 6A to 6E, microlens array 13 is formed on the surface of high dielectric constant layer 9. This is only an example, and the present invention is not limited to this manufacturing method. After deposition of ultraviolet (UV) cured resin 15 on the surface of high dielectric constant layer 9, a desired lens array pattern is foamed in UV cured resin 15 by using nano-imprinting. UV cured resin 15 is irradiated with light to be cured, thereby forming microlens array 13.

As described above, light source device 50 according to the present embodiment has a relatively simple configuration that includes directional control layer 3 formed in light guide body 2, and hence entire light source device 50 can be miniaturized. In light source device 50 according to the present embodiment, the incident angle of the light incident on wave vector conversion layer 10 is determined only by the dielectric constants of plasmon excitation layer 8, and low dielectric constant layer 7 and high dielectric constant layer 9 sandwiching plasmon excitation layer 8. Thus, directionality of the light output from optical element 51 is not limited by that of light-emitting element 1. In light source device 50 according to the present embodiment, through application of the plasmon coupling during the radiation, directionality of the output light can be improved by narrowing the radiation angle of the light output from optical element 51. In other words, according to the present embodiment, the etendue of the light output from optical element 51 can be reduced without any dependence on the etendue of light-emitting element 1. The etendue of the light output from light source device 50 is not limited by the etendue of light-emitting element 1. Thus, lights incident from the plurality of light-emitting elements 1 can be synthesized while maintaining small the etendue of the light output from light source device 50.

In addition, the configuration disclosed in Patent Literature 1 has a problem in which the inclusion of axis matching members 82a to 82d and light source sets 81a and 81b causes enlargement of the entire light source unit. However, according to optical element 51 of the present embodiment, entire optical element 51 can be miniaturized.

The configuration disclosed in Patent Literature 2 has a problem in which the bending of the lights from the plurality of LEDs 85 in various directions at cross prism sheets 88 and 89 causes light loss. However, according to optical element 51 of the present embodiment, use efficiency of the lights from the plurality of light-emitting elements 51 can be improved.

Hereinafter, light source devices of other embodiments are described. The light source devices of the other embodiments are different only as regards the configuration of directional control layer 3 from light source device 50 of the first embodiment, and thus only the directional control layer is described. In the directional control layers of the other embodiments, layers similar to those of directional control layer 3 of the first embodiment are denoted by reference numerals similar to those of the first embodiment. The embodiments below are directed to a configuration where wave vector conversion layer 10 is made of a photonic crystal. However, wave vector conversion layer 10 can be substituted with microlens array 13 described above, and similar effects can be acquired.

Second Embodiment

Figure 11:
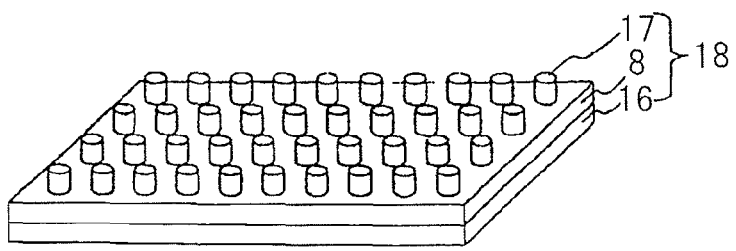
FIG. 11 is a perspective view schematically showing a directional control layer included in a light source device according to a second embodiment.

FIG. 11 is a perspective view showing a directional control layer included in a light source device according to a second embodiment. As shown in FIG. 11, in directional control layer 18 according to the second embodiment, carrier generation layer 16, plasmon excitation layer 8, and wave vector conversion layer 17 made of a photonic crystal are stacked in order on light guide body 2.

In directional control layer 18 according to the second embodiment, wave vector conversion layer 17 also functions as high dielectric constant layer 9 of the first embodiment, and carrier generation layer 16 also functions as low dielectric constant layer 7 of the first embodiment. Thus, to generate plasmon coupling at plasmon excitation layer 8, a dielectric constant of wave vector conversion layer 17 located adjacent to the exit side interface of plasmon excitation layer 8 is set higher than that of carrier generation layer 16 located adjacent to the incident side interface of plasmon excitation layer 8.

According to the light source device of the second embodiment thus configured, the same effects as those of the first embodiment are acquired, and the light source device can be miniaturized more than the first embodiment.

Third Embodiment

Figure 12:
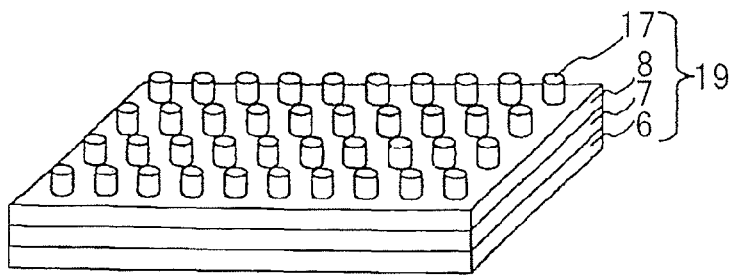
FIG. 12 is a perspective view schematically showing a directional control layer included in a light source device according to a third embodiment.

FIG. 12 is a perspective view showing a directional control layer included in a light source device according to a third embodiment. As shown in FIG. 12, in directional control layer 19 according to the third embodiment, carrier generation layer 6, low dielectric constant layer 7, plasmon excitation layer 8, and wave vector conversion layer 17 made of a photonic crystal are stacked in order on light guide body 2.

In directional control layer 19 according to the third embodiment, wave vector conversion layer 17 also functions as high dielectric constant layer 9 of the first embodiment. Thus, to generate plasmon coupling at plasmon excitation layer 8, the dielectric constant of wave vector conversion layer 17 is set higher than that of low dielectric constant layer 7. However, even when the dielectric constant of wave vector conversion layer 17 is lower than that of low dielectric constant layer 7, directional control layer 19 operates as long as the real part of the effective dielectric constant of wave vector conversion layer 17 side of plasmon excitation layer 8 is higher than that of the effective dielectric constant of low dielectric constant layer 7 side of plasmon excitation layer 8. In other words, for the dielectric constant of low dielectric constant layer 7, a range where the real part of the effective dielectric constant of the exit side portion of plasmon excitation layer 8 is maintained higher than that of the effective dielectric constant of the incident side portion of plasmon excitation layer 8 is permitted.

According to the light source device of the third embodiment thus configured, the same effects as those of the first embodiment are acquired, and the light source device can be miniaturized more than in the first embodiment.

Fourth Embodiment

Figure 13:
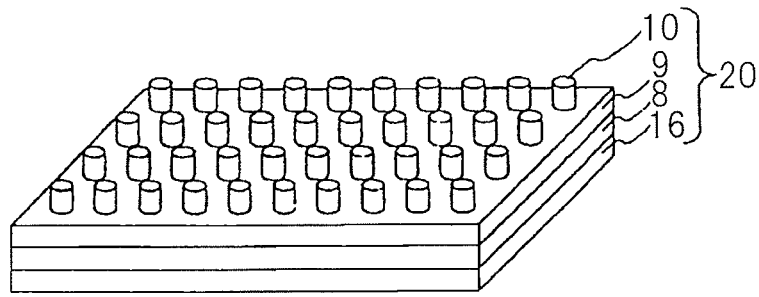
FIG. 13 is a perspective view schematically showing a directional control layer included in a light source device according to a fourth embodiment.

FIG. 13 is a perspective view showing a directional control layer included in a light source device according to the fourth embodiment. As shown in FIG. 13, in directional control layer 20 according to the fourth embodiment, carrier generation layer 16, plasmon excitation layer 8, high dielectric constant layer 9, and wave vector conversion layer 10 made of photonic crystal are stacked in order on light guide body 2.

In directional control layer 20 according to the fourth embodiment, carrier generation layer 16 also functions as low dielectric constant layer 7 of the first embodiment. Thus, to generate plasmon coupling at plasmon excitation layer 8, the dielectric constant of carrier generation layer 16 is set lower than that of high dielectric constant layer 9. However, even when the dielectric constant of carrier generation layer 16 is higher than that of high dielectric constant layer 9, directional control layer 20 operates as long as the real part of the effective dielectric constant of carriage generation layer 16 side of plasmon excitation layer 8 is lower than that of the effective dielectric constant of high dielectric constant layer 9 side of plasmon excitation layer 8. In other words, for the dielectric constant of carrier generation layer 16, a range where the real part of the effective dielectric constant of the exit side portion of plasmon excitation layer 8 is maintained higher than that of an effective dielectric constant of an incident side portion of plasmon excitation layer 8 is permitted.

According to the light source device of the fourth embodiment thus configured, the same effects as those of the first embodiment are acquired, and the light source device can be miniaturized more than in the first embodiment.

Fifth Embodiment

Figure 14:
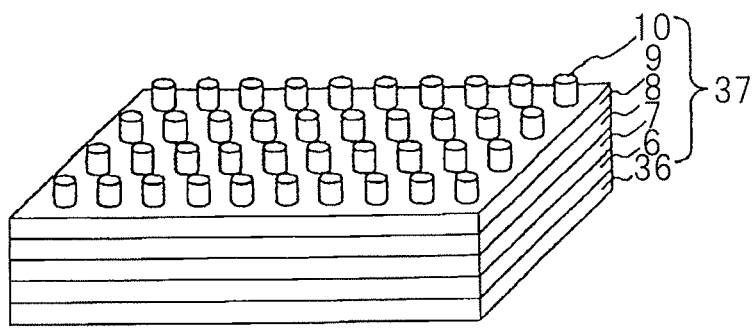
FIG. 14 is a perspective view schematically showing a directional control layer included in a light source device according to a fifth embodiment.

FIG. 14 is a perspective view showing a directional control layer included in a light source device according to a fifth embodiment. As shown in FIG. 14, in directional control layer 37 according to the fifth embodiment, in addition to plasmon excitation layer 8 of the first embodiment, another plasmon excitation layer 36 is disposed.

In directional control layer 37 according to the fifth embodiment, plasmon excitation layer 36 is located between carrier generation layer 6 and light guide body 2. In directional control layer 37, plasmon is excited at plasmon excitation layer 36 by light incident from light guide body 2, and carriers are generated in carrier generation layer 6 by the excited plasmon.

In this case, to generate plasmon resonance at plasmon excitation layer 36, a dielectric constant of carrier generation layer 6 is set lower than that of light guide body 2. To widen the material selection range of carrier generation layer 6, a dielectric constant layer where the real part of a complex dielectric constant is lower than that of light guide body 2 can be disposed between plasmon excitation layer 36 and carrier generation layer 6. In this case, the effective dielectric constant of light guide body 2 side of plasmon excitation layer 36 must be higher than that of carrier generation layer 6 side of plasmon excitation layer 36.

Plasmon excitation layer 8 has a higher plasma frequency than the frequency of light that is generated when single carrier generation layer 6 is excited by light of light-emitting element 1. Plasmon excitation layer 36 has a plasma frequency higher than the emission frequency of light-emitting element 1. When carrier generation layer 6 having a plurality of different emission frequencies is used, plasmon excitation layer 8 will have a higher plasma frequency than any one of different frequencies of lights generated when single carrier generation layer 6 is excited by light of light-emitting element 1. Similarly, when a plurality of types of light-emitting elements different in emission frequency are used, plasmon excitation layer 36 will have a higher plasma frequency than any one of the different emission frequencies of the light-emitting elements.

To couple the light from light-emitting element 1 with plasmon on the interface of plasmon excitation layer 36, there is the following requirement regarding the incident angle of the light incident on plasmon excitation layer 36 from light-emitting element 1. The light must be entered at an incident angle where the component of a wave vector of the incident light parallel to the interface on carrier generation layer 6 side of plasmon excitation layer 36 matches the component parallel to the interface of surface plasmon on carrier generation layer 6 side of plasmon excitation layer 36.

With this configuration, carriers are generated in carrier generation layer 6 by plasmon, and thus a fluorescence enhancement effect by plasmon can be used.

According to the fifth embodiment thus configured, carriers are efficiently generated in carrier generation layer 6 by the fluorescence enhancement effect of plasmon to be increased. Thus, use efficiency of the light from light-emitting element 1 can be further improved.

Sixth Embodiment

Figure 15:
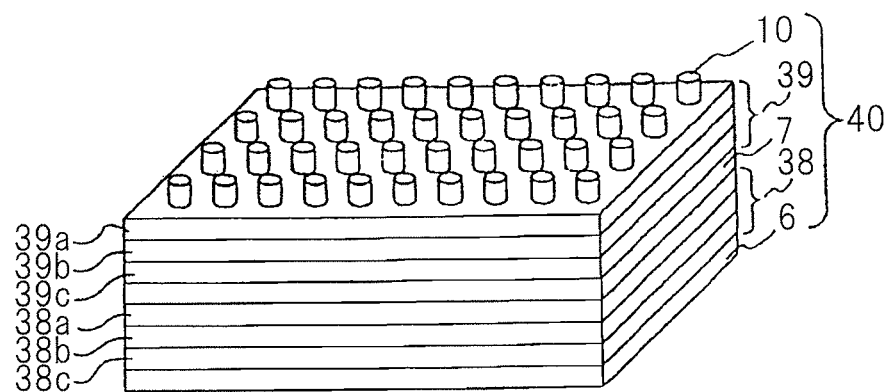
FIG. 15 is a perspective view schematically showing a directional control layer included in a light source device according to a sixth embodiment.

FIG. 15 is a perspective view showing a directional control layer included in a light source device according to the sixth embodiment. As shown in FIG. 15, directional control layer 40 according to the sixth embodiment is similar in configuration to directional control layer 3 of the first embodiment, but is different in that a plurality of dielectric layers, where low dielectric constant layer 7 and high dielectric constant layer 9 of the first embodiment are stacked, are included.

Specifically, directional control layer 40 according to the sixth embodiment includes low dielectric constant layer group 38 formed by stacking a plurality of dielectric layers 38a to 38c and high dielectric constant layer group 39 formed by stacking a plurality of dielectric layers 39a to 39c.

In low dielectric constant layer group 38, the plurality of dielectric layers 38a to 38c are arranged so that dielectric constants can be monotonously decreased from near carrier generation layer 6 to plasmon excitation layer 8. Similarly, in high dielectric constant layer group 39, the plurality of dielectric layers 39a to 39c are arranged so that dielectric constants can be monotonously decreased from near plasmon excitation layer 8 to wave vector conversion layer 10 side made of photonic crystal.

The overall thickness of low dielectric constant layer group 38 is equal to the thickness of the low dielectric constant layer in an embodiment where the directional control layer independently includes the low dielectric constant layer. Similarly, the overall thickness of high dielectric constant layer group 39 is equal to the thickness of the high dielectric constant layer in an embodiment where the directional control layer independently includes the high dielectric constant layer. Each of low dielectric constant layer group 38 and high dielectric constant layer group 39 is shown to have a three-layer structure. However, for example, a layer structure having two to five layers can be employed. When necessary, a configuration where the numbers of dielectric layers included in the low dielectric constant layer group and the high dielectric constant layer group are different or a configuration where only the low dielectric constant layer or the high dielectric constant layer includes a plurality of dielectric constant layers can be employed.

The inclusion of the pluralities of dielectric layers in the high dielectric constant layer and the low dielectric constant layer enables good setting of the dielectric constant of each dielectric layer adjacent to the interface of plasmon excitation layer 8 and matching of refractive indexes between carrier generation layer 6, wave vector conversion layer 10, or a medium such as outside air and each dielectric layer adjacent thereto. In other words, high dielectric layer constant group 39 can reduce the refractive index difference from wave vector conversion layer 10 or a medium such as air on the interface, while low dielectric layer constant group 38 can reduce the refractive index difference from carrier generation layer 6 on the interface.

According to directional control layer 40 of the sixth embodiment thus configured, an appropriate dielectric constant of each dielectric layer adjacent to plasmon excitation layer 8 can be set, and refractive index differences from carrier generation layer 6 and wave vector conversion layer 10 on the interface can be reduced. As a result, light losses can be further reduced, and use efficiency of the light from light-emitting element 1 can be improved.

In place of low dielectric constant layer group 38 and high dielectric constant layer group 39, a single-layer film having a dielectric constant monotonously changed therein can be used. In the case of this configuration, a high dielectric constant layer has a dielectric constant distribution gradually reduced from plasmon excitation layer 7 side to wave vector conversion layer 10 side. Similarly, a low dielectric constant layer has a dielectric constant distribution gradually reduced from carrier generation layer 6 side to plasmon excitation layer 7 side.

Seventh Embodiment

Figure 16:
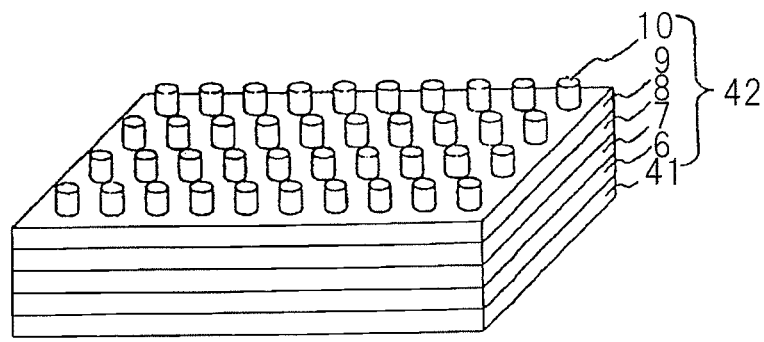
FIG. 16 is a perspective view schematically showing a directional control layer included in a light source device according to a seventh embodiment.

FIG. 16 is a perspective view showing a directional control layer included in a light source device according to the seventh embodiment. As shown in FIG. 16, directional control layer 42 according to the seventh embodiment is similar in configuration to directional control layer 3 of the first embodiment, but different in that another low dielectric constant layer 41 between carrier generation layer 6 and light guide body 2 is included.

In directional control layer 42 according to the seventh embodiment, low dielectric constant layer 41 is located directly below carrier generation layer 6. A dielectric constant of low dielectric constant layer 41 is set lower than that of light guide body 2. The incident angle with respect to light incident part 4 of light guide body 2 is set to a predetermined angle so that light incident from light-emitting element 1 can be in a condition of total reflection on the interface between light guide body 2 and low dielectric constant layer 41.

The light incident on light guide body 2 from light-emitting element 1 is in a condition of total reflection on the interface between light guide body 2 and low dielectric constant layer 41. This full-reflection is accompanied by the generation of an evanescent wave. The evanescent wave acts on carrier generation layer 6 to generate carriers in carrier generation layer 6.

In the light source devices of the first to fifth embodiments, a part of the light output from light-emitting element 1 is transmitted through each layer and exits from each layer. Thus, corresponding to the emission wavelength of light-emitting element 1 and the emission wavelength of carrier generation layer 6, two types of lights that are different by 30 nanometers to 300 nanometers in wavelength are caused to exit from the light source device. However, as in the case of the present embodiment, by generating the carriers only by an evanescent wave, among the lights output from light source device 50, the light corresponding to the emission wavelength of carrier generation layer 6 can be increased while the light corresponding to the emission wavelength of light-emitting element 1 is reduced. Thus, according to the seventh embodiment, use efficiency of the light from light-emitting element 1 can be improved.

Eighth Embodiment

Figure 17:
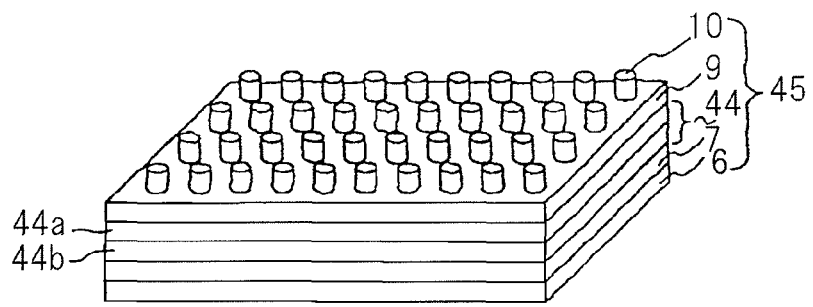
FIG. 17 is a perspective view schematically showing a directional control layer included in a light source device according to an eighth embodiment.

FIG. 17 is a perspective view showing a directional control layer included in a light source device according to the eighth embodiment. As shown in FIG. 17, directional control layer 45 according to the eighth embodiment is similar in configuration to directional control layer 3 of the first embodiment, but different in that plasmon excitation layer group 44 includes a plurality of stacked metal layers 44a and 44b.

In plasmon excitation layer group 44 of directional control layer 45 according to the eighth embodiment, metal layers 44a and 44b are made of different metallic materials to be stacked. This enables plasmon excitation layer group 44 to adjust the plasma frequency.

When the plasma frequency is adjusted to be high on plasmon excitation layer 44, for example, metal layers 44a and 44b are respectively made of Ag and Al. When the plasma frequency is adjusted to be low on plasmon excitation layer 44, for example, metal layers 44a and 44b are respectively made of Ag and Au. Plasmon excitation layer 44 is shown to have a two-layered structure as an example. Needless to say, however, plasmon excitation layer 44 can include three or more metal layers when necessary.

According to directional control layer 45 of the eighth embodiment thus configured, plasmon excitation layer 44 includes the plurality of metal layers 44a and 44b. This enables adjustment of an effective plasma frequency on plasmon excitation layer 44 close to the frequency of light incident on plasmon excitation layer 44 from carrier generation layer 6. As a result, use efficiency of the light incident on optical element 51 from light-emitting element 1 can be further improved.

Ninth Embodiment

Figure 18:
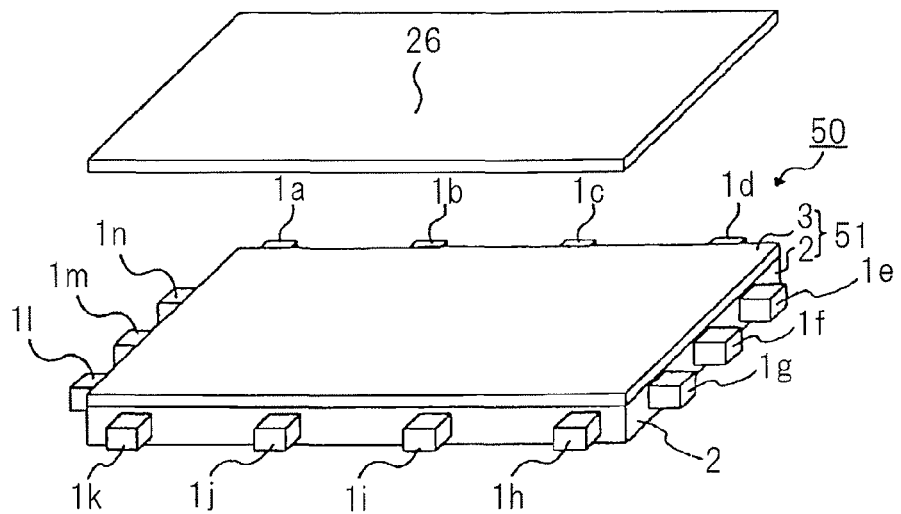
FIG. 18 is a perspective view showing a light source device according to a ninth embodiment.

FIG. 18 is a perspective view showing a light source device according to a ninth embodiment. As shown in FIG. 18, the light source device according to the ninth embodiment includes, as a polarizing conversion element for arranging axially symmetric polarized light incident from optical element 5 in a predetermined polarized state, axially symmetric polarization ½ wavelength plate 26 for linearly polarizing the light incident from optical element 51. Linearly polarizing light output from light source device 50 by axially symmetric polarization ½ wavelength plate 26 can achieve a light source device where a polarized state of the output light is uniform. Arranging the axially symmetric polarized light in the predetermined state by the polarizing conversion element is not limited to linear polarizing. Circular polarizing is also included. As a directional control layer, needless to say, any of the directional control layers according to the first to eight embodiments can be applied.

Figure 19:
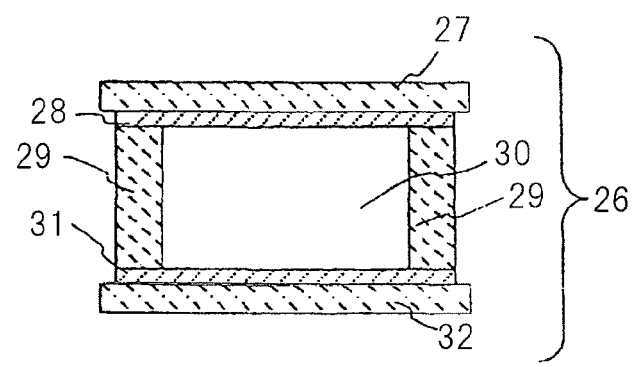
FIG. 19 is a vertical sectional view showing a structure of a ½ wavelength plate for axially symmetric polarization included in the light source device according to the ninth embodiment.

FIG. 19 is a vertical sectional view showing the structure of ½ wavelength plate 26 for axially symmetric polarization. The configuration of axially symmetric polarization ½ wavelength plate 26 is only an example, and thus is in no way limitative. As shown in FIG. 19, axially symmetric polarization ½ wavelength plate 26 includes a pair of glass substrates 27 and 32 in which oriented films 28 and 31 are respectively formed, liquid crystal layer 30 located by sandwiching oriented films 28 and 31 of glass substrates 27 and 32 opposite to each other between glass substrates 27 and 32, and spacer 29 located between glass substrates 27 and 32.

For liquid crystal layer 30, a refractive index ne is larger than a refractive index no, where no is the refractive index for ordinary light, and ne is the refractive index for extraordinary light. A thickness d of liquid crystal layer 30 satisfies (ne−no)×d=λ/2, where λ is a wavelength of incident light in vacuum.

Figure 20A:
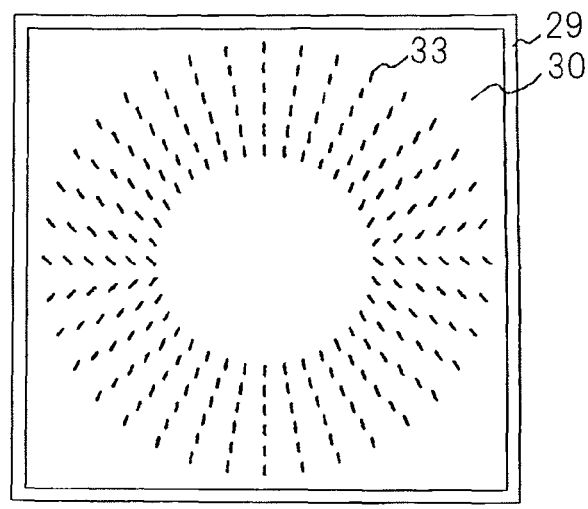
FIG. 20A is an explanatory perspective view showing the ½ wavelength plate for axially symmetric polarization included in the light source device according to the ninth embodiment.
Figure 20B:
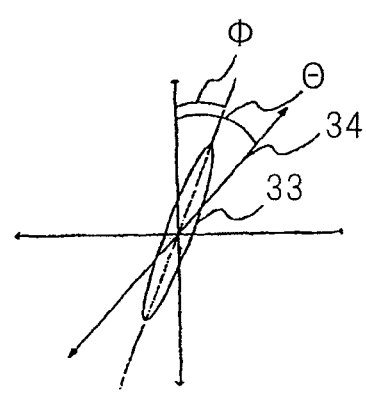
FIG. 20B is an explanatory perspective view showing the ½ wavelength plate for axially symmetric polarization included in the light source device according to the ninth embodiment.

FIGS. 20A and 20B are explanatory schematic views showing axially symmetric polarization ½ wavelength plate 26. FIG. 20A is a transverse sectional view showing a state where liquid crystal layer 30 of axially symmetric polarization ½ wavelength plate 26 is cut in cross-section that is parallel to the principal surface of glass substrate 32. FIG. 20B is an explanatory schematic view showing the orientation direction of liquid crystal molecules 33.

As shown in FIG. 20A, liquid crystal molecules 33 are concentrically arranged around axially symmetric polarization ½ wavelength plate 26. As shown in FIG. 20B, liquid crystal molecules 33 are oriented in a direction that satisfies the relationships of θ=2φ or θ=2φ−180, where φ is an angle formed between the main axis of liquid crystal molecules 33 and the coordinate axis near the main axis and θ is an angle formed between the coordinate axis and the polarizing direction. FIGS. 20A and 20B show the inside of the same plane.

Figure 21:
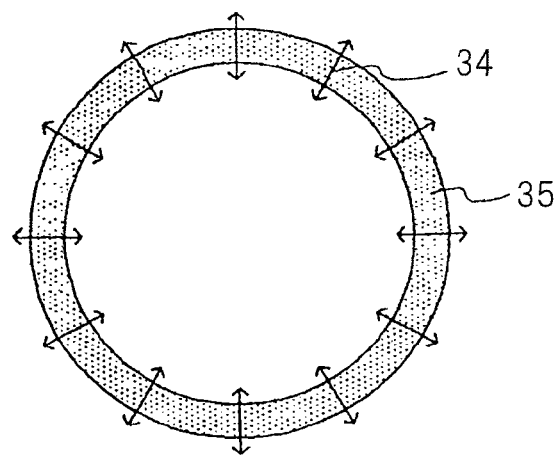
FIG. 21 is a perspective view showing a far-field pattern and a polarizing direction of output light when no ½ wavelength plate for axially symmetric polarization is included in the light source device according to the embodiment.

FIG. 21 shows far-field pattern 35 of output light when the light source device includes no axially symmetric polarization ½ wavelength plate. In the first to eighth embodiments, it is only p-polarized light that causes plasmon coupling on plasmon excitation layer 8. Thus, as shown in FIG. 21, far-field pattern 35 of the output light from the light source device becomes axially polarized light where a polarizing direction is radial.

Figure 22:
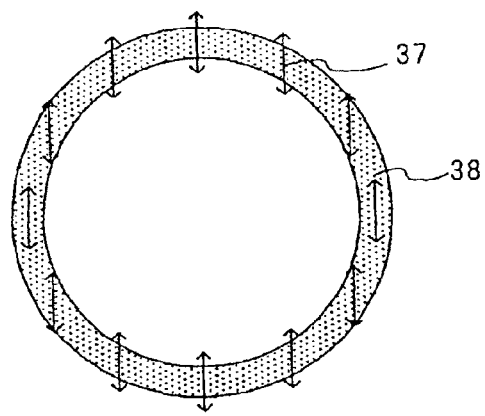
FIG. 22 is a perspective view showing a far-field pattern and a polarizing direction of output light when a ½ wavelength plate for axially symmetric polarization is included in the light source device according to the embodiment.

FIG. 22 shows far-field pattern 35 of output light passed through axially symmetric polarization ½ wavelength plate 26. According to the present embodiment, as shown in FIG. 22, using axially symmetric polarization ½ wavelength plate 26 enables acquisition of output light where polarizing direction 37 is uniform.

Example 1

Figure 23:
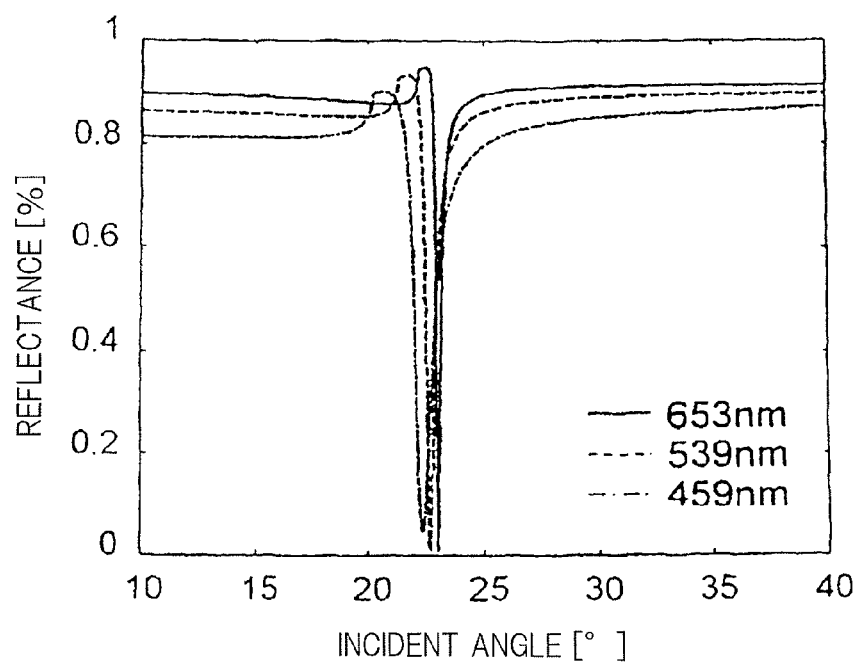
FIG. 23 is an explanatory view showing plasmon resonance characteristics according to Example.

FIG. 23 illustrates plasmon resonance characteristics according to the embodiment. FIG. 23 shows the relationship between the incident angle and reflectance, when in a light source device using $TiO_2$ for high dielectric constant layer 9, Ag for plasmon excitation layer 8, and porous $SiO_2$ for low dielectric constant layer 7, lights having wavelengths of 653 nanometers, 539 nanometers, and 459 nanometers enter into plasmon excitation layer 8. High dielectric constant layer 9 and low dielectric constant layer 7 are formed sufficiently thick compared with the wavelengths.

As shown in FIG. 23, a steep reduction of reflectance near an incident angle of 23 degrees is larger than a full-reflection angle, and hence coupling with plasmon is apparently a cause. Thus, according to the Example, there is anisotropy in an angle coupled with plasmon.

Figure 24:
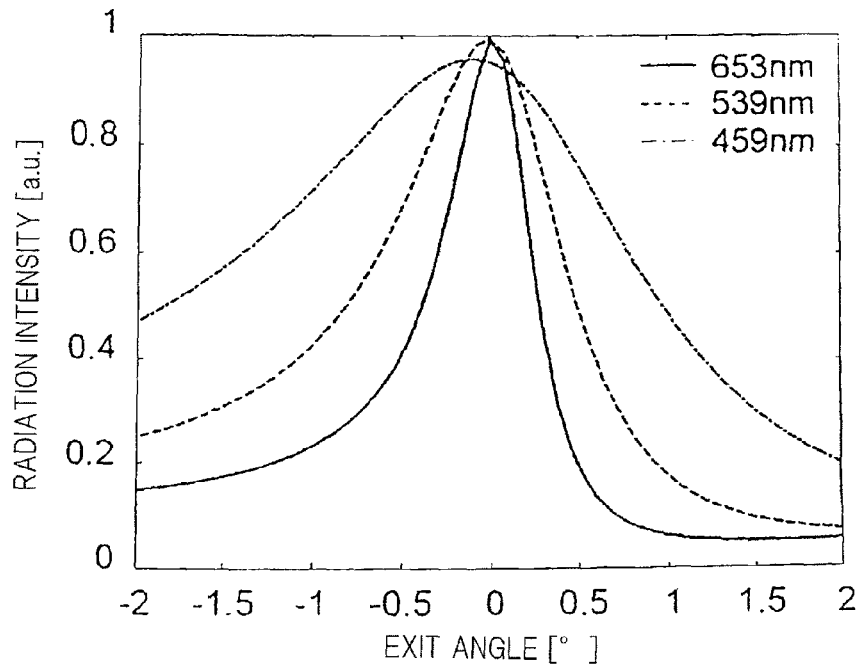
FIG. 24 is an explanatory view showing radiation angle characteristics according to the Example.

FIG. 24 illustrates radiation angle characteristics according to the embodiment. FIG. 24 shows the angle distribution of output light from light exit part 5 when, in the light source device using $TiO_2$ for high dielectric constant layer 9, Ag for plasmon excitation layer 8, and porous $SiO_2$ for low dielectric constant layer 7, the lights having wavelengths of 653 nanometers, 539 nanometers, and 459 nanometers enter into the directional control layer.

For simplicity, calculation was two-dimensionally carried out. When the full width of an angle where intensity of the output light from the light source device is halved is a radiation angle, radiation angles are respectively 0.67 degrees, 1.3 degrees, and 3.0 degrees for the lights having wavelengths of 653 nanometers, 539 nanometers, and 459 nanometers. Grating pitches of the photonic crystal of wave vector conversion layer 10 were respectively set to 583 nanometers, 471 nanometers, and 386 nanometers for the lights having wavelengths of 653 nanometers, 539 nanometers, and 459 nanometers.

As described above, according to the light source device of the present embodiment, directionality of the radiation angle of the output light from the light source device can be improved by using plasmon excitation layer 8, and directionality can be improved more by appropriately adjusting the grating structure of wave vector conversion layer 10 to narrow the radiation angle by ±5 degrees.

Example 2

Figure 25:
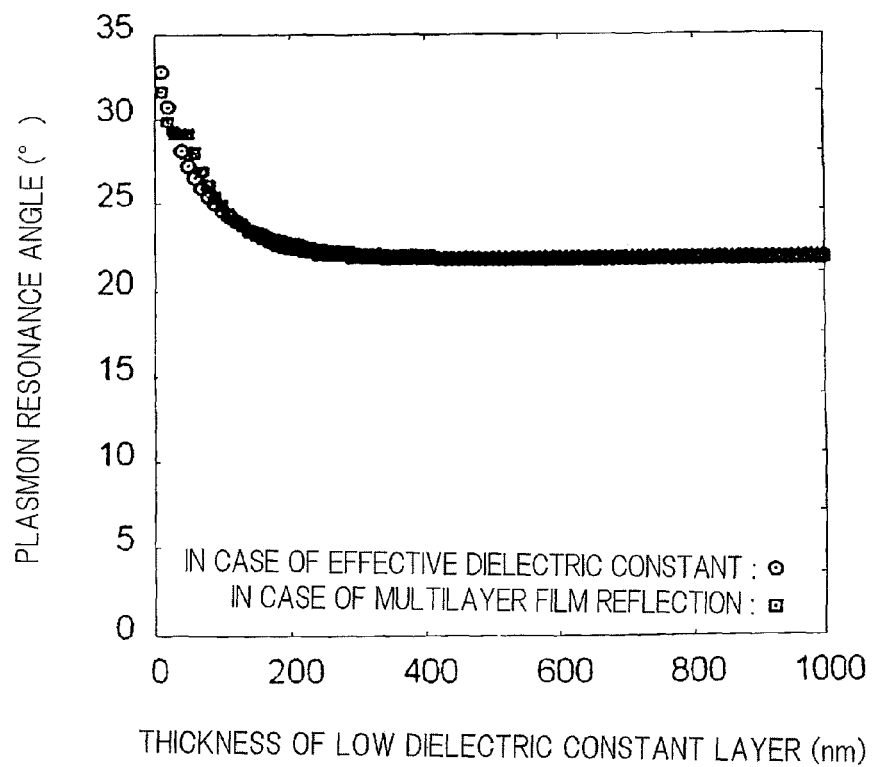
FIG. 25 shows comparison of a plasmon resonance angle obtained from an effective dielectric constant with a plasmon resonance angle obtained from multilayer film reflection calculation in the light source device according to the first embodiment.

FIG. 25 shows comparison of a plasmon resonance angle (○ in the drawing) obtained from an effective dielectric constant calculated by using expression (1) with a plasmon resonance angle (□ in the drawing) obtained from multilayer film reflection calculation in light source device 50 according to the first embodiment. In FIG. 25, the horizontal axis indicates the thickness of the low dielectric constant layer, and the vertical axis indicates the plasmon resonance angle. As shown in FIG. 25, the calculated value by an effective dielectric constant and the calculated value by multilayer film reflection match each other, and a condition of plasmon resonance can apparently be defined by the effective dielectric constant defined by expression (1).

$SiO_2$, a fluorescent substance using PVA (polyvinyl alcohol) as a base material, porous $SiO_2$, Ag, and $TiO_2$ were respectively used for light guide body 2, carrier generation layer 6, low dielectric constant layer 7, plasmon excitation layer 8, and high dielectric constant layer 9, and thicknesses thereof were respectively set to 0.5 millimeters, 70 nanometers, 10 nanometers, 50 nanometers, and 0.5 millimeters. Calculation was carried out with the emission wavelength of carrier generation layer 6 set to 460 nanometers. The material for wave vector conversion layer was $TiO_2$, and the depth, pitch, and duty ratio of the periodic structure were respectively set to 200 nanometers, 280 nanometers, and 0.5. Output light under these conditions does not have an annular distribution, but has a Gaussian distribution. However, the pitch is shifted from 250 nanometers to disrupt the peak, thereby acquiring an annular orientation distribution.

Figure 26:
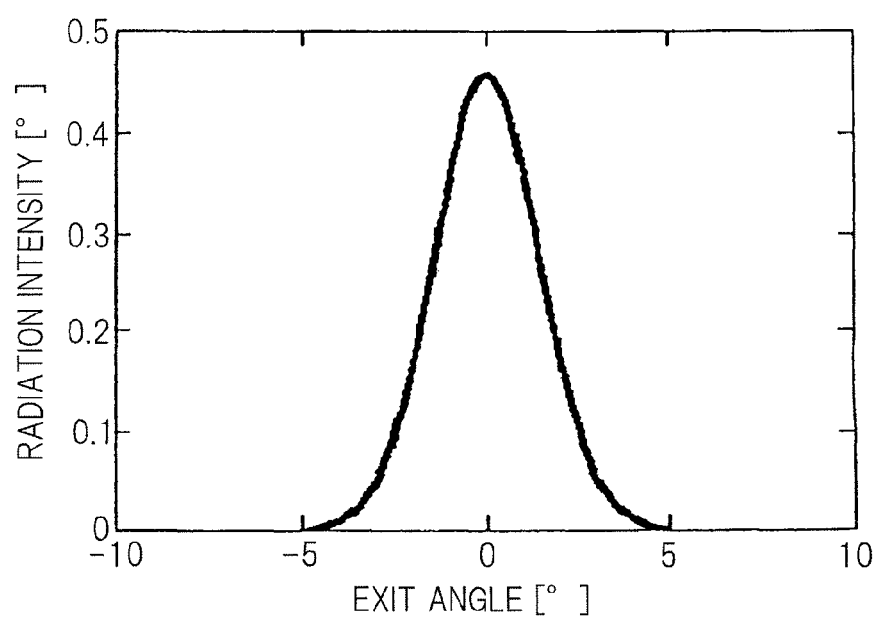
FIG. 26 shows an angle distribution in the output light of the light source device according to the first embodiment.

FIG. 26 shows angle distribution in the output light of light source device 50 according to the first embodiment calculated by adding the thickness of each layer. In FIG. 26, the horizontal axis indicates the exit angle of the output light, while a vertical axis indicates intensity of the output light.

For simplicity, calculation was carried out two-dimensionally. When the full width of an angle where intensity of the light output from optical element 50 was halved was a radiation angle, the radiation angle was ±1.7 (deg) for each light having a wavelength of 460 nanometers.

Thus, according to light source device 50 of the embodiment, directionality of the radiation angle of the output light from light source device 50 can be improved, and directionality can be further improved by appropriately adjusting the grating structure of wave vector conversion layer 10 to narrow the radiation angle by ±5 degrees.

According to the Example 2, effective dielectric constants of the exit side portion and the incident side portion of plasmon excitation layer 8 are respectively 9.8 and 2.0 by expression (1). Imaginary parts of z-direction wave numbers on the exit side and the incident side of the surface plasmon are respectively 0 and $1.28 \times 10^7$ by expression (2). Assuming that the effective interaction distance of the surface plasmon is a distance where intensity of the surface plasmon is $e^{-2}$, by $1/\text{Im}(k_{spp,z})$, effective interaction distances of the surface plasmon are respectively infinite and 78 nanometers on the exit side portion and the incident side portion.

The light source device according to the present embodiment, which is suitably used as a light source device of an image display device, can be used for a light source device included in a projection display device, a near-field light source device of a liquid crystal panel (LCD), a mobile phone as a backlight, and an electronic device such as a PDA (Personal Data Assistant).

Figure 27:
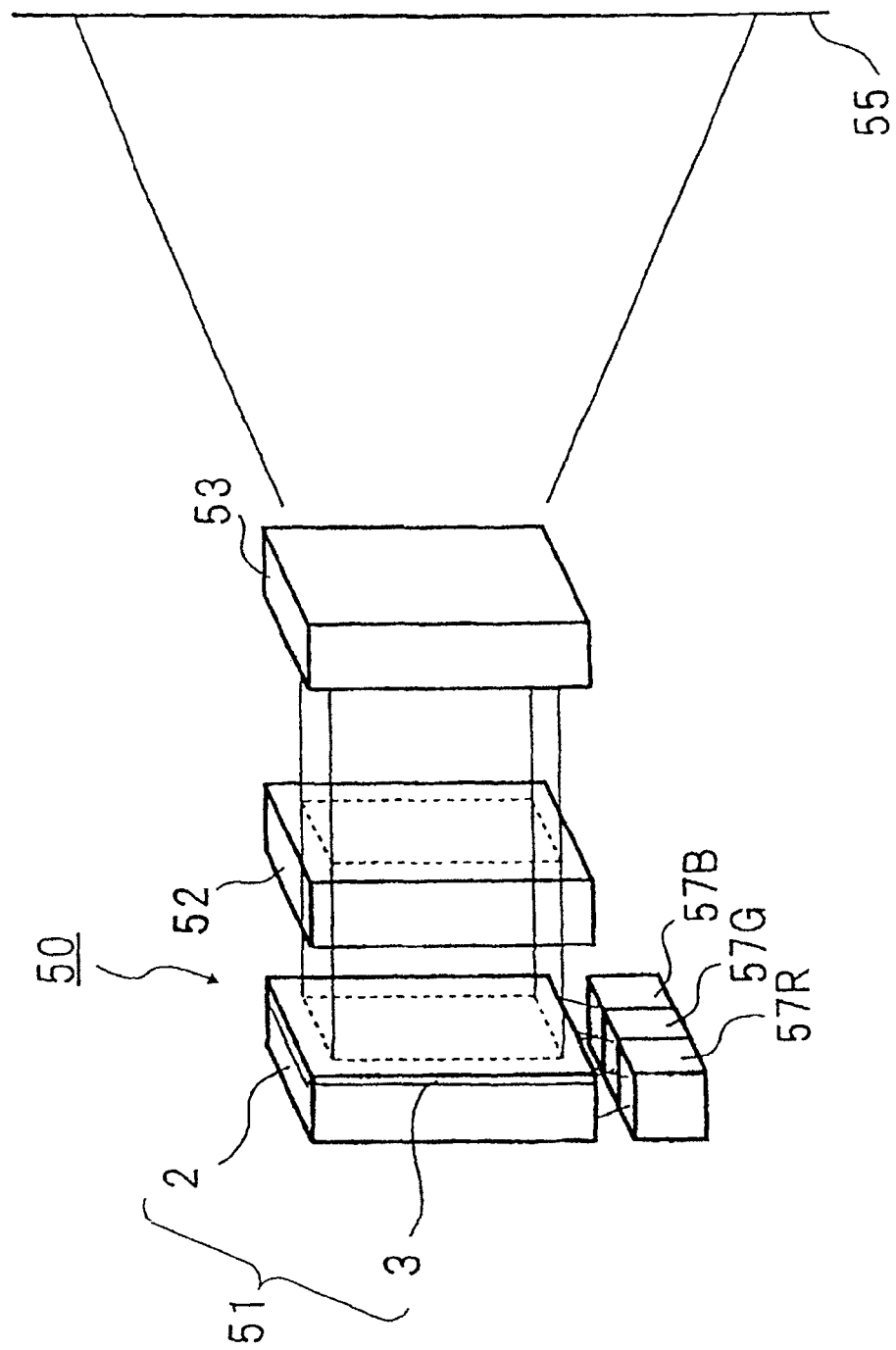
FIG. 27 is a schematic view showing a LED projector to which the light source device of the embodiment is applied.

Lastly, a LED projector serving as a projection display device to which the light source device of the embodiment is applied is briefly described. FIG. 27 schematically shows the projection display device of the embodiment.

As shown in FIG. 27, the LED projector according to the embodiment includes optical element 51 of the abovementioned embodiment, liquid crystal panel 52 into which light output from optical element 51 enters, and projection optical system 53 that includes a projection lens for projecting light output from liquid crystal panel 52 to projection surface 55 such as a screen.

Light source device 50 included in the LED projector includes red (R) light LED 57R, green (G) light LED 57G, and blue (B) light LED 57B arranged on one side of light guide body 2 that has a directional control layer. A carrier generation layer included in the directional control layer of light source device 50 contains fluorescent substances for red (R) light, green (G) light, and blue (B) light.

Figure 28:
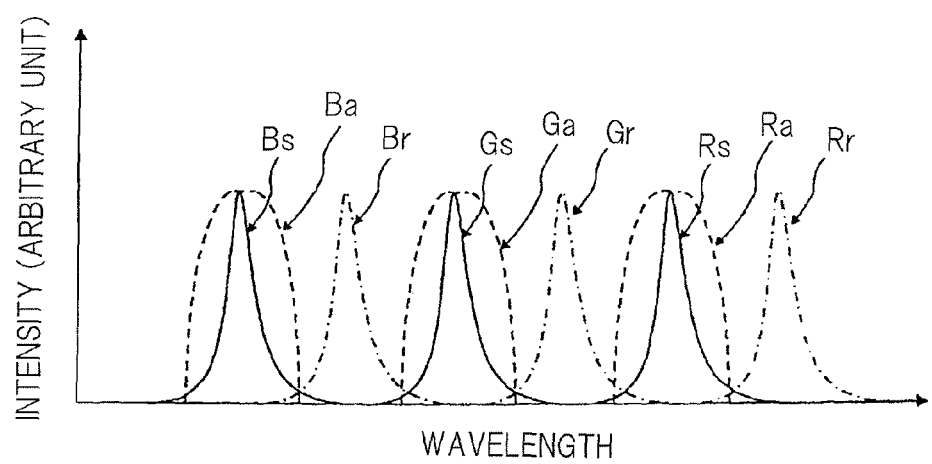
FIG. 28 is an explanatory view showing the wavelength of a light source, the excitation wavelength of a fluorescent substance, and the emission wavelength used in the LED projector to which the light source device of the embodiment is applied.

FIG. 28 shows the relationship among a wavelength of light-emitting element 1 used for the LED projector, an excitation wavelength of the fluorescent substance, and intensity of the emission wavelength. As shown in FIG. 28, emission wavelengths Rs, Gs, and Bs of R light LED 57R, G light LED 57G, and B light LED 57B and excitation wavelengths Ra, Ga, and Ba of the fluorescent substances are set almost equal. The emission wavelengths Rs, Gs, and Bs, the excitation wavelengths Ra, Ga, and Ba, and emission wavelengths Rr, Gr, and Br of the fluorescent substances are set not to overlap one another. Emission spectra of R light LED 57R, G light LED 57G, and B light LED 57B are set to match excitation spectra of the fluorescent substances or within the excitation spectra. Emission spectra of the fluorescent substances are set not to substantially overlap any excitation spectra of the fluorescent substances.

The LED projector employs a time-division system. A control circuit unit (not shown) switches R light LED 57R, G light LED 57G, and B light LED 57B so that only one of the LEDs can emit light.

According to the LED projector of the present embodiment, the inclusion of light source device 50 of the above-mentioned embodiment enables improvement of the luminance of a projected image.

A configuration example of a single-plate liquid crystal projector has been described as the LED projector of the embodiment. Needless to say, however, the present invention can be applied to a three-plate liquid crystal projector that includes liquid crystal panels for R, G, and B.

The present invention has been described referring to the embodiments. However, the present invention is not limited to the embodiments. Various changes understandable to those skilled in the art can be made to the configuration and the specifics of the present invention.

This application claims priority from Japanese Patent Application No. 2009-227331 filed Sep. 30, 2009, which is hereby incorporated by reference herein in its entirety.

The invention claimed is:

1. An optical element comprising:
a light guide body into which light from a light-emitting element enters;
a carrier generation layer formed in the light guide body, in which carriers are generated by the light from the light guide body;
a plasmon excitation layer stacked on the carrier generation layer, which has a plasma frequency higher than a frequency of light generated when the carrier generation layer is excited by the light from the light-emitting element; and
an exit layer stacked on the plasmon excitation layer, which converts light incident from the plasmon excitation layer into light having a predetermined exit angle to output the light,
wherein the plasmon excitation layer is sandwiched between two layers having dielectric properties,
wherein a layer which is formed adjacently to a light-guide-body-side surface of the plasmon excitation layer, and another layer which is formed adjacently to an exit-layer-side surface of the plasmon excitation layer are the layers having dielectric properties, and wherein an effective dielectric constant of an incident side portion including a structure stacked on the light guide body side of the plasmon excitation layer is lower than that of an exit side portion including a structure stacked on the exit layer side of the plasmon excitation layer and a medium brought into contact with the exit layer.

2. The optical element according to claim 1, wherein:
the effective dielectric constant is determined based on a dielectric constant distribution of dielectrics in the incident side portion or the exit side portion and based on a distribution of a surface plasmon in the direction vertical to the interface of the plasmon excitation layer in the incident side portion or the exit side portion.

3. The optical element according to claim 1, further comprising a dielectric constant layer formed adjacently to the exit layer side of the plasmon excitation layer or to the light guide body side of the plasmon excitation layer, or to the exit layer side of the plasmon excitation layer and the light guide body side of the plasmon excitation layer.

4. The optical element according to claim 3, wherein:
the plasmon excitation layer is sandwiched between the pair of dielectric constant layers; and
a dielectric constant of the dielectric constant layer adjacent to the light guide body side of the plasmon excitation layer is lower than that of the dielectric constant layer adjacent to the exit layer side of the plasmon excitation layer.

5. The optical element according to claim 3, wherein the dielectric constant layer formed adjacently to the light guide body side of the plasmon excitation layer is a low dielectric constant layer having a lower dielectric constant than that of the layer adjacent to the exit layer side of the plasmon excitation layer.

6. The optical element according to claim 3, wherein the dielectric constant layer formed adjacently to the exit layer side of the plasmon excitation layer is a high dielectric constant layer having a higher dielectric constant than that of the layer adjacent to the light guide body side of the plasmon excitation layer.

7. The optical element according to claim 1, further comprising another plasmon excitation layer having a higher plasma frequency than a frequency of the light-emitting element, which is formed between the light guide body and the carrier generation layer.

8. The optical element according to claim 1, further comprising a low dielectric constant layer formed adjacently to the carrier generation layer side of the light guide body and having a lower dielectric constant than the light guide body,
wherein in the carrier generation layer, carriers are generated by an evanescent wave generated when the light from the light guide body is in a condition of total reflection on an interface with the carrier generation layer.

9. The optical element according to claim 5, wherein the low dielectric constant layer is formed by stacking a plurality of dielectric layers different in dielectric constant, and the plurality of dielectric layers are arranged so that dielectric constants can be sequentially decreased from the carrier generation layer side to the plasmon excitation layer side.

10. The optical element according to claim 6, wherein the high dielectric constant layer is formed by stacking a plurality of dielectric layers different in dielectric constant, and the plurality of dielectric layers are arranged so that dielectric constants can be sequentially decreased from the plasmon excitation layer side to the exit layer side.

11. The optical element according to claim 5, wherein the low dielectric constant layer has a distribution of dielectric constants gradually decreased from the carrier generation layer side to the plasmon excitation layer side.

12. The optical element according to claim 6, wherein the high dielectric constant layer has a distribution of dielectric constants gradually decreased from the plasmon excitation layer side to the exit layer side.

13. The optical element according to claim 1, wherein the plasmon excitation layer is formed by stacking a plurality of metal layers made of different metallic materials.

14. The optical element according to claim 1, wherein the exit layer has a surface periodic structure.

15. The optical element according to claim 1, wherein the exit layer is made of a photonic crystal.

16. The optical element according to claim 5, wherein the low dielectric constant is a porous layer.

17. The optical element according to claim 1, wherein the plasmon excitation layer is made of one element from among Ag, Au, Cu, Al, and either Pt or an alloy containing at least one of said elements.

18. A light source device comprising:
the optical element according to claim 1; and
a light-emitting element located on an outer circumferential part of the light guide body.

19. The light source device according to claim 18, further comprising a polarizing conversion element for arranging axially symmetric polarized light incident from the optical element in a predetermined polarized state.

20. A projection display device comprising:
the light source device according to claim 18; and
a projection optical system that projects a projected image by light output from the light source device.

21. The light source device according to claim 1, wherein the plasmon excitation layer is a flat layer.

* * * * *

UNITED STATES PATENT AND TRADEMARK OFFICE
CERTIFICATE OF CORRECTION

| | | |
|---|---|---|
| PATENT NO. | : 9,146,350 B2 | Page 1 of 1 |
| APPLICATION NO. | : 13/395921 | |
| DATED | : September 29, 2015 | |
| INVENTOR(S) | : Masanao Natsumeda | |

It is certified that error appears in the above-identified patent and that said Letters Patent is hereby corrected as shown below:

In the Specification:

Column 5, Line 54: Delete "plasomon" and insert -- plasmon --

Column 8, Line 56: Delete "(sulphorhofdamine 101)" and insert -- (sulforhodamine 101) --

Column 11, Line 55: Delete "foamed" and insert -- formed --

Column 17, Line 20: Delete "symmetrtic" and insert -- symmetric --

In the Claims:

Column 22, Line 48: Delete "A light source device according to Claim 1" and insert -- An optical element according to claim 1 --

Signed and Sealed this
Nineteenth Day of April, 2016

Michelle K. Lee
*Director of the United States Patent and Trademark Office*